(12) United States Patent
Tomimatsu et al.

(10) Patent No.: US 9,222,708 B2
(45) Date of Patent: Dec. 29, 2015

(54) MAGNETIC REFRIGERATION DEVICE AND MAGNETIC REFRIGERATION SYSTEM

(71) Applicant: KABUSHIKI KAISHA TOSHIBA, Tokyo (JP)

(72) Inventors: Norihiro Tomimatsu, Mitaka (JP); Toshiro Hiraoka, Yokohama (JP); Ryosuke Yagi, Yokohama (JP); Akiko Saito, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 221 days.

(21) Appl. No.: 14/077,835

(22) Filed: Nov. 12, 2013

(65) Prior Publication Data

US 2014/0130515 A1   May 15, 2014

(30) Foreign Application Priority Data

Nov. 13, 2012 (JP) ................. 2012-249106

(51) Int. Cl.
    *F25B 21/00* (2006.01)
(52) U.S. Cl.
    CPC ........... *F25B 21/00* (2013.01); *F25B 2321/002* (2013.01); *Y02B 30/66* (2013.01)
(58) Field of Classification Search
    CPC ...................................................... F25B 21/00
    See application file for complete search history.

(56) References Cited

U.S. PATENT DOCUMENTS

| | | | |
|---|---|---|---|
| 2004/0182086 A1* | 9/2004 | Chiang et al. | 62/3.1 |
| 2007/0220901 A1* | 9/2007 | Kobayashi et al. | 62/3.1 |
| 2008/0078184 A1* | 4/2008 | Saito et al. | 62/3.1 |
| 2008/0236171 A1* | 10/2008 | Saito et al. | 62/3.1 |
| 2009/0217674 A1* | 9/2009 | Kaji et al. | 62/3.1 |
| 2009/0217675 A1* | 9/2009 | Kobayashi et al. | 62/3.1 |
| 2012/0031108 A1* | 2/2012 | Kobayashi et al. | 62/3.1 |
| 2012/0174597 A1* | 7/2012 | Kaji et al. | 62/3.1 |

FOREIGN PATENT DOCUMENTS

| | | |
|---|---|---|
| CN | 102759216 A | 10/2012 |
| JP | H10-30855 A | 2/1998 |
| JP | 2008-82662 | 4/2008 |

OTHER PUBLICATIONS

First Office Action from the State Intellectual Property Office of the People's Republic of China, mailed Jul. 15, 2015, for counterpart Chinese Patent Application No. 201310562470.2, and English translation thereof (11 pages total).

Ju; "Solid-State Refrigeration Based on the Electrocaloric Effect for Electronics Cooling", Journal of Electronic Packaging, vol. 132, pp. 041004-1-041004-6, (2010).

\* cited by examiner

*Primary Examiner* — Emmanuel Duke
(74) *Attorney, Agent, or Firm* — Finnegan, Henderson, Farabow, Garrett & Dunner, LLP

(57) ABSTRACT

According to one embodiment, a magnetic refrigeration device includes magnetic bodies, a magnetic field application unit, a thermal storage medium, and a heat transfer unit. The magnetic bodies are arrayed at an interval. The application unit applies and removes a magnetic field to and from the magnetic bodies, respectively. The medium is arranged to face at least one of the magnetic bodies. The medium has no Curie point within a range of a temperature change of the magnetic bodies and removal. The heat transfer unit selectively brings the medium into thermal contact with the magnetic bodies or thermally isolates the medium from the magnetic bodies, and transfers heat from the magnetic bodies to the medium or from the medium to the magnetic bodies in synchronism with magnetic field application and removal.

6 Claims, 12 Drawing Sheets

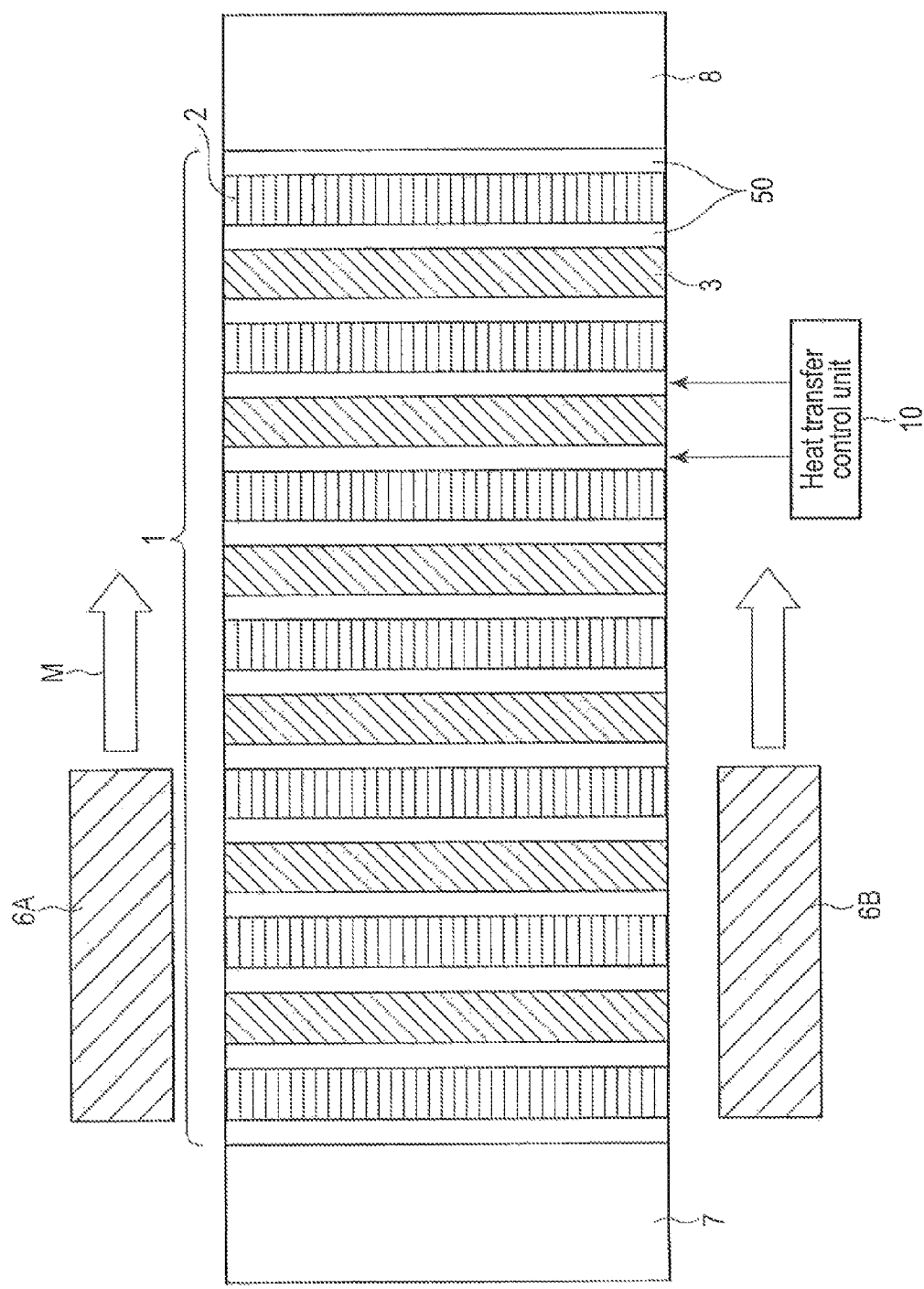
F I G. 1

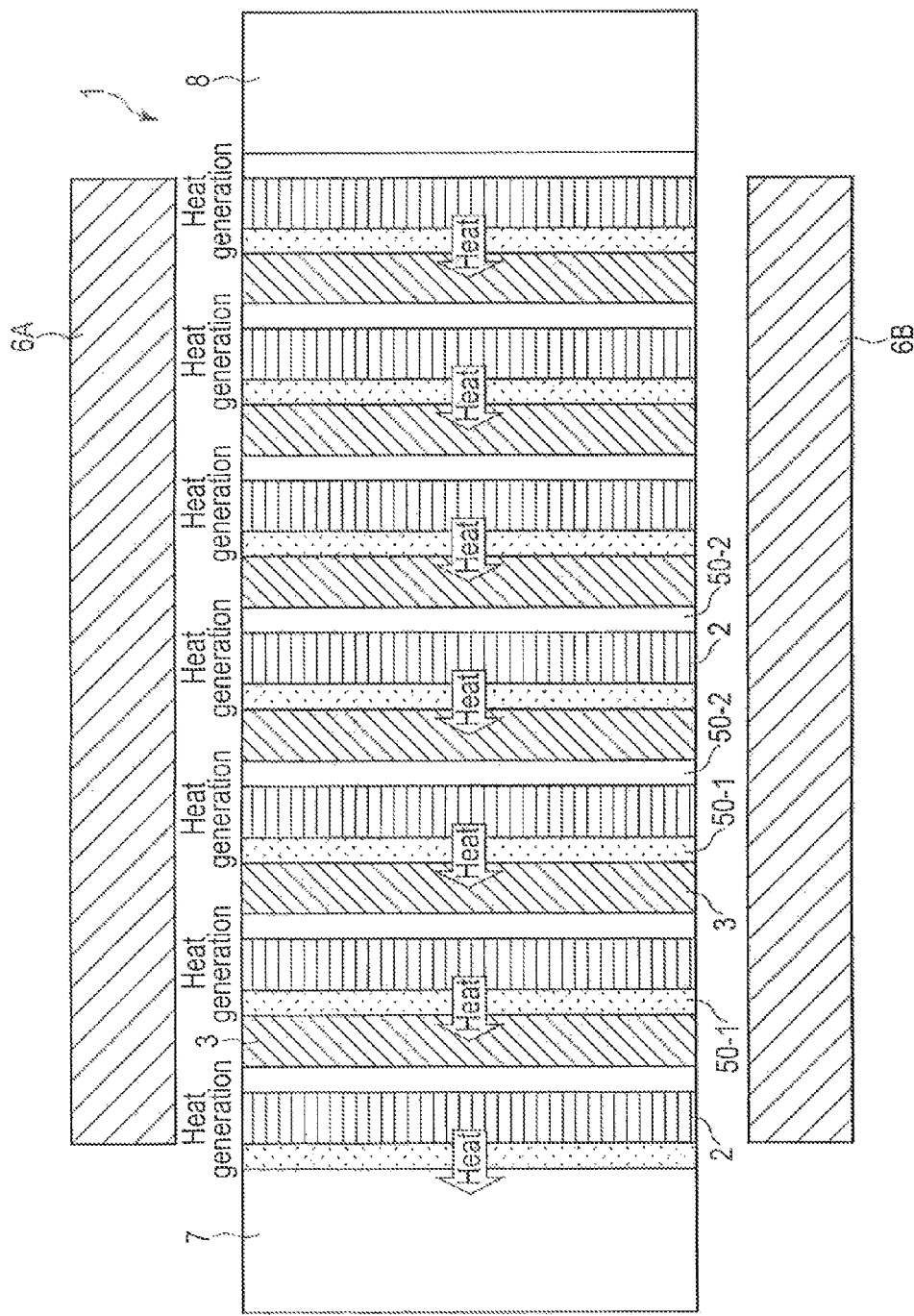
F I G. 3

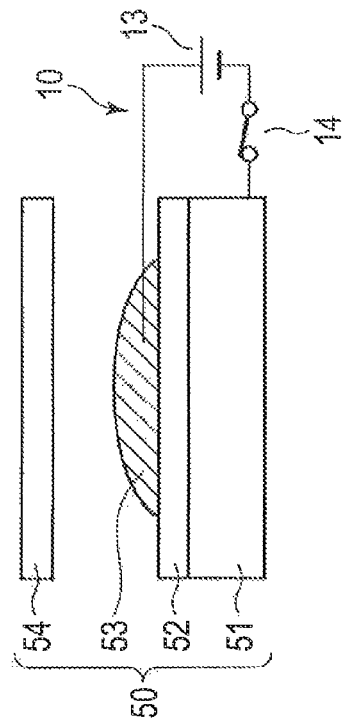
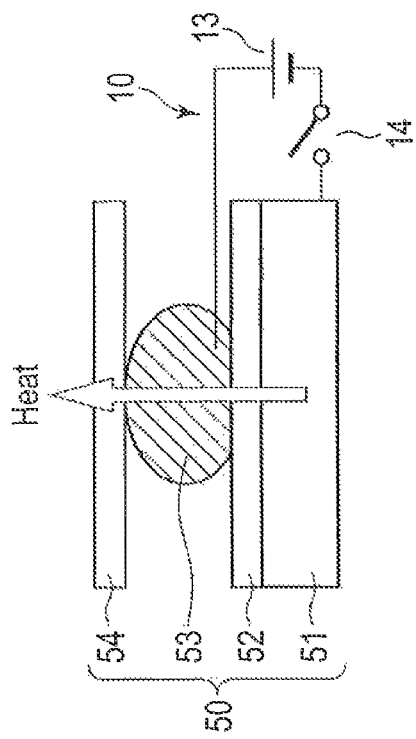
FIG. 6A
FIG. 6B

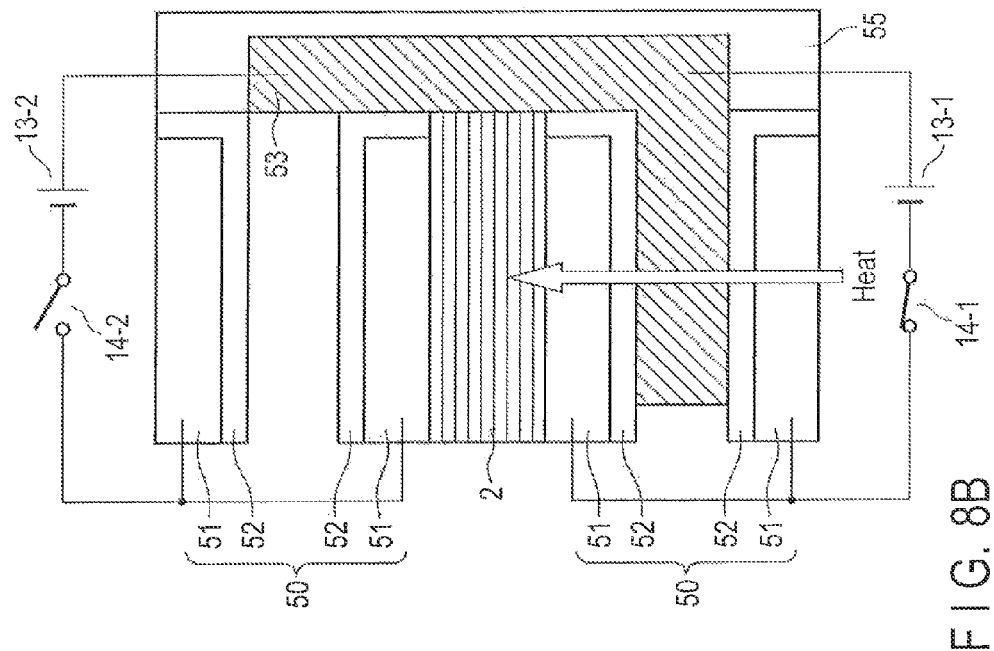
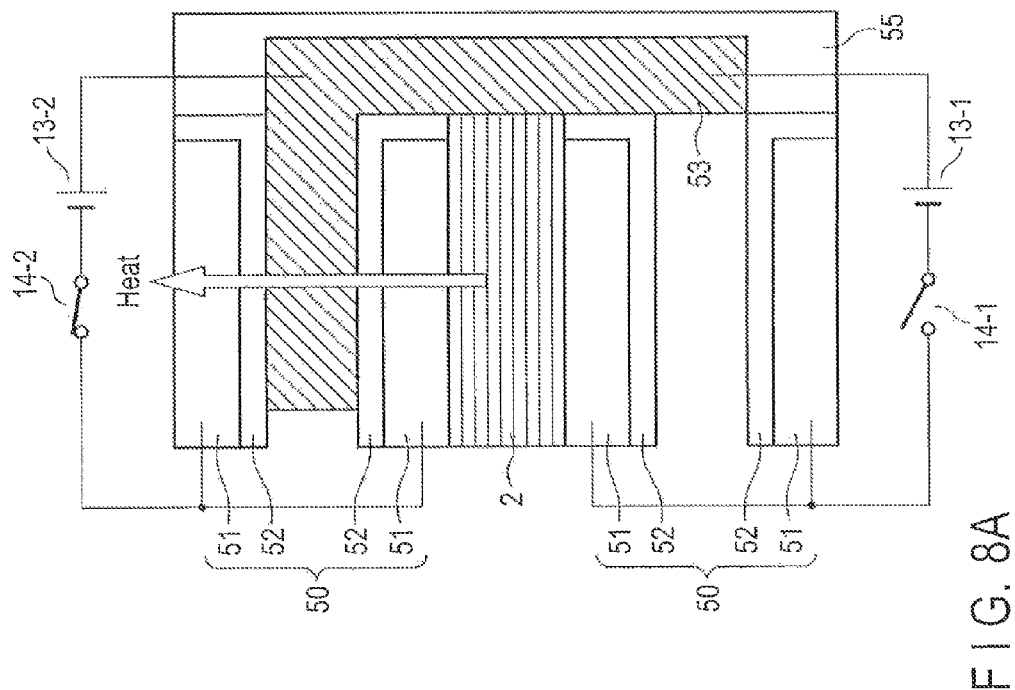

MAGNETIC REFRIGERATION DEVICE AND MAGNETIC REFRIGERATION SYSTEM

CROSS-REFERENCE TO RELATED APPLICATIONS

This application is based upon and claims the benefit of priority from Japanese Patent Application No. 2012-249106, filed Nov. 13, 2012, the entire contents of which are incorporated herein by reference.

FIELD

Embodiments described herein relate generally to a magnetic refrigeration device and a magnetic refrigeration system.

BACKGROUND

In recent years, expectations are running high for magnetic refrigeration that is one of environmentally friendly refrigeration technologies with a high refrigeration efficiency, and research and development of magnetic refrigeration technologies in a room temperature range is being actively conducted.

As one of the magnetic refrigeration technologies, an AMR (Active Magnetic Regenerative Refrigeration) method has been proposed. The AMR method positively utilizes lattice entropy that is regarded as an inhibitory factor for magnetic refrigeration in the room temperature range. A magnetic body is thus caused to have the function of performing a magnetic refrigeration operation by a magneto-caloric effect and simultaneously provide a heat storage effect of storing cryogenic energy generated by the magnetic refrigeration operation.

In a representative AMR apparatus, for example, a heat-exchanger fluid such as water circulates through a magnetic container filled with particulate magnetic bodies. The heat-exchanger fluid is reciprocally moved in synchronism with application and removal of a magnetic field to and from the magnetic container, respectively, thereby implementing a refrigeration cycle.

In the AMR refrigeration cycle, no compressor is necessary, and a little power suffices. For this reason, a high refrigeration efficiency is expected to be attained as compared to, for example, a conventional refrigeration method by a compression cycle using CFC.

BRIEF DESCRIPTION OF THE DRAWINGS

FIG. 1 is a sectional view schematically showing the structure of the main parts of a magnetic refrigeration device according to the first embodiment;

FIG. 3 is a schematic sectional view for explaining the operation of the magnetic refrigeration device according to the first embodiment in which the unit structures shown in FIGS. 2A and 2B are stacked;

FIGS. 6A and 6B are sectional views schematically showing an arrangement of the heat transfer unit shown in FIG. 1 using a thermal conductive liquid;

FIGS. 8A and 8B are sectional views schematically showing a structure formed by stacking the unit structures of the heat transfer unit shown in FIGS. 6A and 6B;

DETAILED DESCRIPTION

Figure 2A:
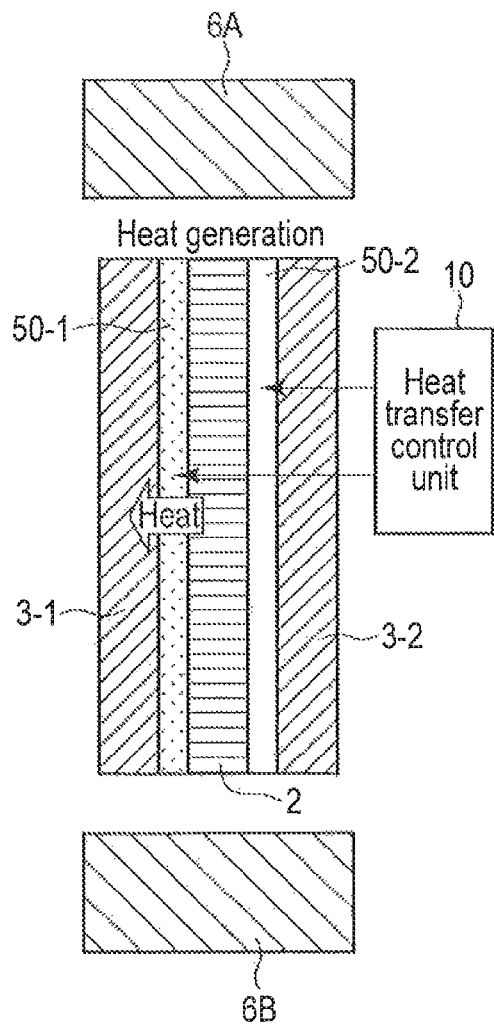
FIGS. 2A and 2B are schematic sectional views for explaining the operation of a unit structure of the magnetic refrigeration device according to the first embodiment shown in FIG. 1.

A magnetic refrigeration device according to an embodiment and a magnetic refrigeration system including the magnetic refrigeration device will now be described with reference to the accompanying drawings.

As described above, in the AMR refrigeration cycle, no compressor is necessary, and a little power suffices. For this reason, a high refrigeration efficiency is expected to be attained as compared to, for example, a conventional refrigeration method by a compression cycle using CFC.

However, to speed up a magnetic regeneration cycle for downsizing or increase in output power, a heat-exchanger fluid need be circulated through a magnetic container at a high speed. Therefore, fluid pressure loss will increase and high power will be required to reciprocate the heat-exchanger fluid. Thus, there is a problem that the refrigeration efficiency may lower to the contrary.

Embodiments are made in consideration of the above circumstances. An object of the embodiments is to provide a magnetic refrigeration system capable of reducing its size, having high-power performance and improving the refrigeration efficiency.

According to one embodiment, a magnetic refrigeration device includes magnetic bodies, a magnetic field application unit, a thermal storage medium, and a heat transfer unit. The magnetic bodies are arrayed at an interval. Each of the magnetic bodies has a magneto-caloric effect. The magnetic field application unit applies and removes a magnetic field to and from the magnetic bodies, respectively. The thermal storage medium is arranged to face at least one of the magnetic bodies. The thermal storage medium has no Curie point within a range of a temperature change of the magnetic bodies caused by magnetic field application and removal by the magnetic field application unit. The thermal storage medium has a heat storage effect. The heat transfer unit selectively brings the thermal storage medium into thermal contact with the magnetic bodies or thermally isolates the thermal storage medium from the magnetic bodies, and transfers heat from the magnetic bodies to the thermal storage medium or from the thermal storage medium to the magnetic bodies in synchronism with magnetic field application and removal by the magnetic field application unit.

(First Embodiment)

FIG. 1 shows a magnetic refrigeration system according to the first embodiment. This magnetic refrigeration system includes a magnetic refrigeration device 1. In the magnetic refrigeration device 1, magnetic bodies 2 having a magneto-caloric effect and solid thermal storage media 3 are alternately juxtaposed. Heat transfer units 50 are provided between the magnetic bodies 2 and the solid thermal storage media 3 and at the outermost ends on the high and low temperature sides. Arrays of the heat transfer unit 50, the magnetic body 2, the heat transfer unit 50, and the solid thermal storage medium 3 are arranged along the longitudinal direction (from the high temperature side to the low temperature side). The magnetic refrigeration system shown in FIG. 1 includes magnetic field application units 6A and 6B that can move along a longitudinal direction M (from the high temperature side to the low temperature side or in an opposite direction) so as to be able to apply a magnetic field to the magnetic bodies 2 and then remove the magnetic field.

More specifically, the magnetic field application units 6A and 6B are arranged outside the magnetic refrigeration device 1. The two magnetic field application units 6A and 6B are arranged to sandwich the magnetic refrigeration device 1 at intervals, thereby forming a magnetic circuit. The magnetic field application units 6A and 6B can be formed from permanent magnets or electromagnets.

The magnetic field application units 6A and 6B can be moved by a moving mechanism (not shown) in the direction indicated by the arrow M shown in FIG. 1. A magnetic field can be applied and removed to and from the magnetic bodies 2, respectively, as the magnetic field application units 6A and 6B move.

When the magnetic field application units 6A and 6B are formed from electromagnets, magnetic field application/removal to/from the magnetic bodies 2 can be performed by on/off-controlling a current flowing to the electromagnets without moving the magnetic field application units 6A and 6B. Hence, the magnetic field application units 6A and 6B formed from electromagnets need no moving mechanism.

The magnetic body 2, the heat transfer unit 50, and the solid thermal storage medium 3 shown in FIG. 1 constitute a unit structure of the magnetic refrigeration device. As shown in FIG. 2A, a heat transfer unit 50-1 is provided between the magnetic body 2 and one solid thermal storage medium 3-1 adjacent to the magnetic body 2. A heat transfer unit 50-2 is provided between the magnetic body 2 and another solid thermal storage medium 3-2 adjacent to the magnetic body 2. The magnetic refrigeration device further includes a heat transfer control unit 10. The heat transfer control unit 10 controls the thermal resistances of the heat transfer units 50-1 and 50-2 and selectively controls the thermal resistance between the magnetic body 2 and the solid thermal storage medium 3-1 and that between the magnetic body 2 and the solid thermal storage medium 3-2, thereby controlling heat transfer from the high temperature side to the low temperature side. FIG. 1 also shows the heat transfer control unit 10. For the sake of simplicity, the heat transfer control unit 10 is illustrated to control the heat transfer units 50 by two representative arrows. However, not only the two heat transfer units 50 but also other heat transfer units 50 are controlled by the heat transfer control unit 10, as a matter of course. The heat transfer control unit 10 individually controls the heat transfer units 50 at an appropriate timing in accordance with heat absorption and heat generation of the magnetic bodies 2.

The heat transfer units 50 are controlled, thereby controlling heat transfer from the high temperature side to the low temperature side.

The principle of basic heat transport in the magnetic refrigeration device 1 will be described in more detail with reference to FIGS. 2A and 2B.

FIG. 2A shows a state in which the magnetic field application units 6A and 6B apply a magnetic field to the magnetic body 2. On the other hand, FIG. 2B shows a state in which the magnetic field applied from the magnetic field application units 6A and 6B to the magnetic body 2 is removed. FIG. 2B illustrates the magnetic field application units 6A and 6B by broken lines as if they were removed. However, also included is a case in which the magnetic field application units 6A and 6B are physically arranged, and their magnetic field is turned off, as a matter of course.

As shown in FIG. 2A, when the magnetic field application units 6A and 6B apply a magnetic field to the magnetic body 2, the temperature of the magnetic body 2 rises due to the magneto-caloric effect. That is, when the magnetic field application units 6A and 6B apply a magnetic field to the magnetic body 2, the magnetic body 2 is heated, and a heat generation state is obtained. The heat transfer control unit 10 lowers the thermal resistance of the one heat transfer unit 50-1 adjacent to the magnetic body 2 (a heat propagation state in which the thermal resistance of the heat transfer unit indicated by the dotted unit in FIG. 2A lowers, and heat can efficiently propagate) and raises the thermal resistance of the other heat transfer unit 50-2 (a heat insulation state in which the thermal resistance of the heat transfer unit indicated by the hollow unit in FIG. 2A rises, and heat cannot efficiently propagate). Hence, the heat is transferred to the one solid thermal storage medium 3-1 that is actually in thermal contact with the magnetic body 2 to heat the solid thermal storage medium 3-1.

Figure 2B:
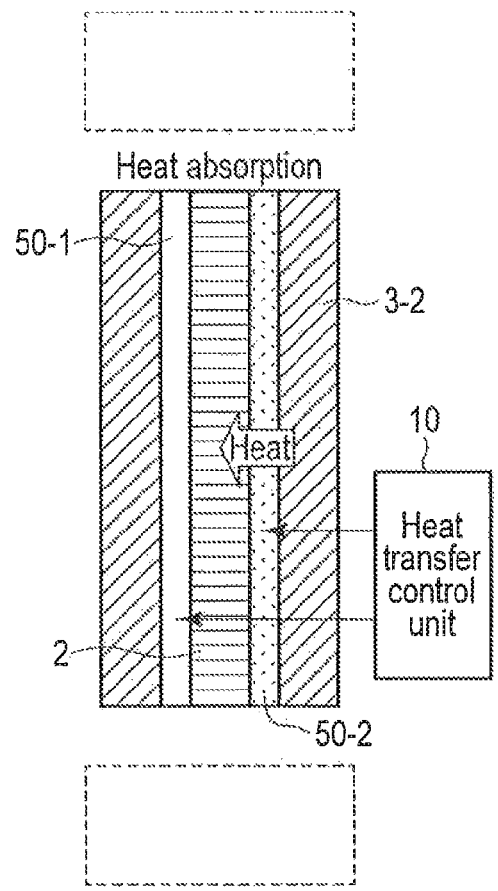

As shown in FIG. 2B, when the magnetic field application units 6A and 6B remove the magnetic field from the magnetic body 2, a heat absorption state in which the magnetic body 2 externally takes away heat is obtained. When the heat absorption effect is generated in the magnetic body 2, the heat transfer control unit 10 raises the thermal resistance of the one heat transfer unit 50-1 adjacent to the magnetic body 2 (a heat insulation state indicated by the hollow unit in FIG. 2B) and lowers the thermal resistance of the other heat transfer unit 50-2 (a heat propagation state indicated by the dotted unit in FIG. 2B). Hence, the heat is taken away from the other solid thermal storage medium 3-2 that is actually in thermal contact with the magnetic body 2 to cool the solid thermal storage medium 3-2.

The solid thermal storage medium 3 arranged on one outermost side of the magnetic refrigeration device 1 is fixed to a high-temperature-side heat exchange unit 7 via the heat transfer unit 50 while being in thermal contact. The solid thermal storage medium 3 arranged on the other outermost side of the magnetic refrigeration device 1 is fixed to a low-temperature-side heat exchange unit 8 via the heat transfer unit 50 while being in thermal contact. As described above, when heat absorption and heat dissipation occur in the magnetic refrigeration device 1, heat is transferred from the side of the low-temperature-side heat exchange unit 8 to the side of the high-temperature-side heat exchange unit 7. The low-temperature-side heat exchange unit 8 mostly loses heat and cools off. The high-temperature-side heat exchange unit 7 mostly increases in temperature and externally dissipates heat.

As already described with reference to FIG. 1, the magnetic field application units 6A and 6B are arranged to be movable along the moving direction M corresponding to the longitudinal direction of the magnetic refrigeration device 1. The magnetic field application units 6A and 6B apply an external magnetic field to the magnetic bodies 2 along with the movement along the moving direction M, and remove the applied magnetic field along with moving away from the magnetic bodies 2. The heat transfer control unit 10 changes the thermal resistances of the above-described heat transfer units 50-1 and 50-2 in synchronism with the magnetic field application/removal by the magnetic field application units 6A and 6B. Hence, the heat absorption effect or heat propagation effect generated in the magnetic bodies 2 transfers heat in the magnetic refrigeration device 1, cools the low-temperature-side heat exchange unit 8, and causes the high-temperature-side heat exchange unit 7 to dissipate the heat.

More specifically, as shown in FIG. 3, the heat transfer unit 50-1 in the low thermal resistance state is in contact with the magnetic body 2 on the high temperature side, and the heat is transferred from the magnetic body 2 to the solid thermal storage medium 3 via the heat transfer unit 50-1. On the other hand, the heat transfer unit 50-2 in the high thermal resistance state thermally insulates the magnetic body 2 on the low temperature side, thereby preventing the heat from being transferred from the magnetic body 2 to the low temperature side.

Figure 4:
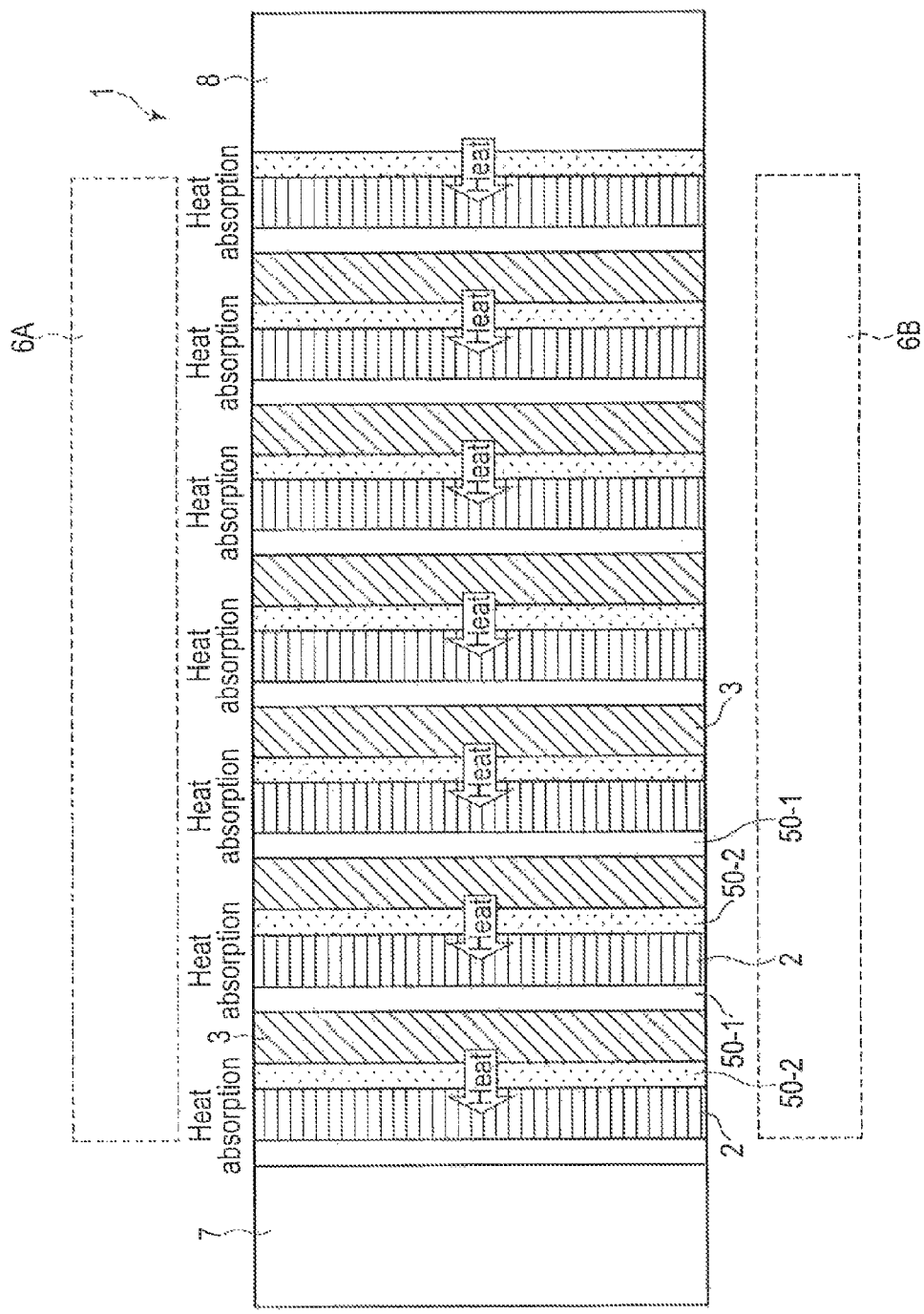
FIG. 4 is a schematic sectional view for explaining the operation of the magnetic refrigeration device according to the first embodiment in which the unit structures shown in FIGS. 2A and 2B are stacked.

As shown in FIG. 4, when the magnetic field application units 6A and 6B move or stop generating the magnetic field, and the magnetic field is removed, the temperature of the magnetic body lowers along with the removal of the magnetic field due to the magneto-caloric effect. When the thermal resistance of the heat transfer unit 50-1 rises, and that of the heat transfer unit 50-2 lowers in synchronism with the decrease in the temperature of the magnetic body, the heat moves from the solid thermal storage medium 3-2 to the magnetic body 2 (heat absorption effect). More specifically, as shown in FIG. 4, the heat transfer unit 50-2 in the low thermal resistance state is in contact with the magnetic body 2 on the low temperature side, and the magnetic body 2 takes away heat from the solid thermal storage medium 3 via the heat transfer unit 50-2 to cool the solid thermal storage medium 3. On the other hand, the heat transfer unit 50-1 in the high thermal resistance state thermally insulates the magnetic body 2 on the high temperature side, thereby preventing the heat from being transferred from the magnetic body 2 to the low temperature side.

When the state in which one of the solid thermal storage media 3 is heat-insulated and the state in which the other is heat-insulated are alternately repeated, as shown in FIGS. 3 and 4, the heat is transported from the solid thermal storage medium 3 on the low temperature side to the solid thermal storage medium 3 on the high temperature side. The solid thermal storage media 3 are thermally isolated due to the heat storage effect, and a temperature difference is created between the low-temperature-side solid thermal storage medium 3 and the high-temperature-side solid thermal storage medium 3, which are arrayed from the low temperature side to the high temperature side.

The magnetic refrigeration device 1 shown in FIG. 3 is formed into a stacked structure in which the unit structures shown in FIGS. 2A and 2B are stacked. The temperature differences generated in the unit structures are stacked in the stacked structure. Hence, the magnetic refrigeration device 1 can generate a large temperature difference across it.

In the magnetic refrigeration device 1, the heat transported to the end of the stacked structure is externally dissipated via the high-temperature-side heat exchange unit 7. On the other hand, the end on the low temperature side absorbs external heat via the low-temperature-side heat exchange unit 8. The high-temperature-side heat exchange unit 7 and the low-temperature-side heat exchange unit 8 are made of, for example, Cu (copper), which has a high thermal conductivity.

Figure 5:
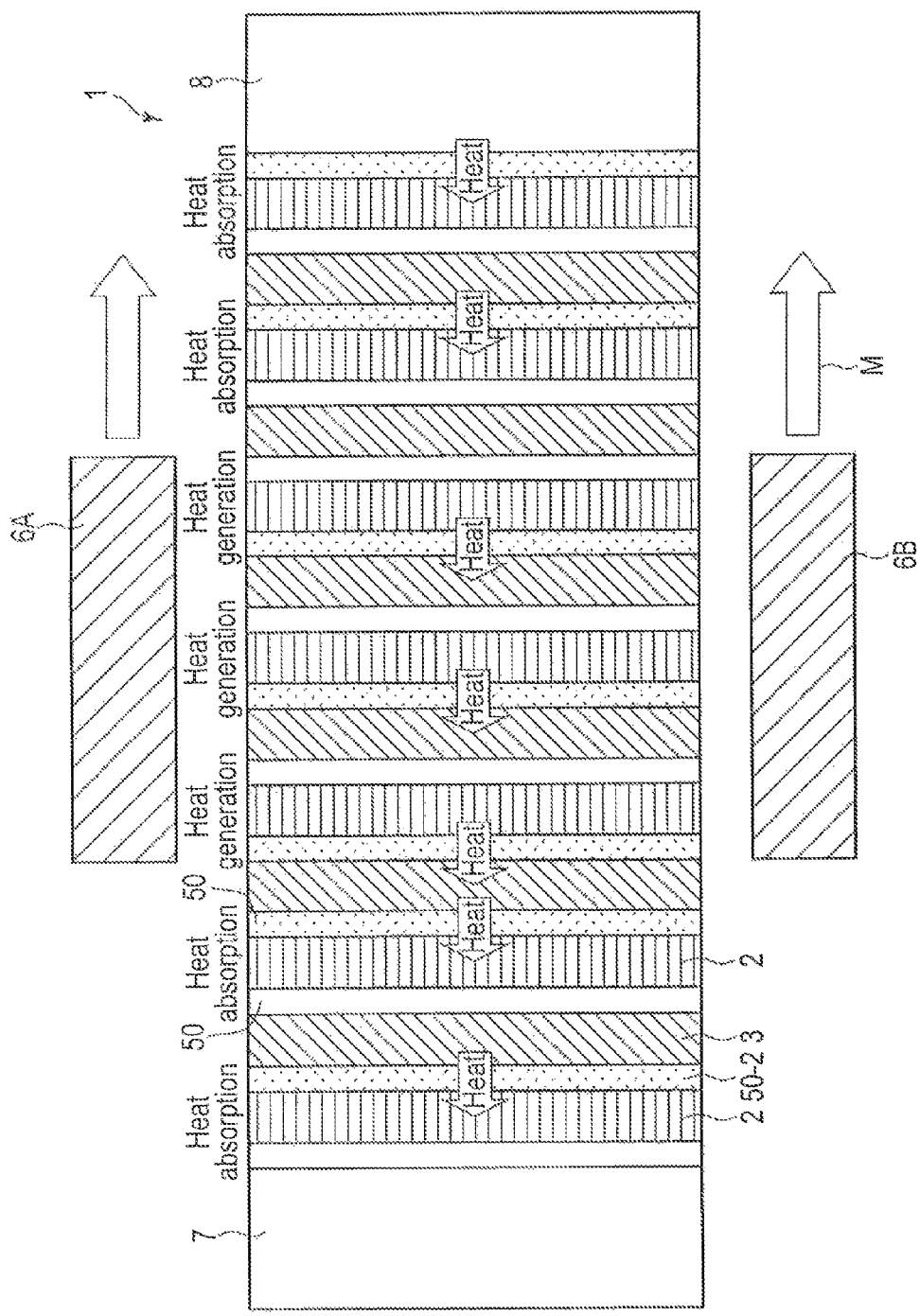
FIG. 5 is a schematic sectional view for explaining the operation of the magnetic refrigeration device according to the first embodiment in which the unit structures shown in FIGS. 2A and 2B are stacked.

FIG. 5 shows an example of the operation of the magnetic refrigeration device 1 when the magnetic field application units 6A and 6B move to apply/remove a magnetic field to/from the magnetic bodies 2. In each unit structure of the magnetic refrigeration device where the magnetic field is applied to the magnetic body 2, the thermal resistance of the heat transfer unit 50 on the high temperature side is low. In each unit structure of the magnetic refrigeration device where the magnetic field is not applied to the magnetic body 2, the thermal resistance of the heat transfer unit 50 on the low temperature side is low. When the thermal resistance of the heat transfer unit 50 of each unit structure of the magnetic refrigeration device is changed in synchronism with the movement of the magnetic field application units, heat can be moved from the low-temperature-side heat exchange unit 8 to the high-temperature-side heat exchange unit 7. In the embodiment shown in FIG. 5, as long as the magnetic field application units 6A and 6B move in the direction indicated by the arrow M, the heat exchange unit 7 is maintained on the high temperature side, and the heat exchange unit 8 is maintained on the low temperature side. Hence, when moving the magnetic field application units 6A and 6B to the moving end of the magnetic refrigeration device 1 and then returning them to the initial position, the magnetic field application units 6A and 6B need to return to the initial position on the magnetic refrigeration device 1 without applying a magnetic field to the magnetic refrigeration device 1.

As is apparent from the embodiment shown in FIGS. 3, 4, and 5, the solid thermal storage media 3 having a characteristic such that their temperature is not changed due to magnetic field application/removal are arranged between the adjacent magnetic bodies 2. When the magnetic field is simultaneously applied or removed to or from the plurality of adjacent magnetic bodies 2, and the temperatures of the adjacent magnetic bodies 2 simultaneously rise or lower, a temperature difference always exists between each magnetic body 2 and the solid thermal storage medium 3 adjacent to it. It is therefore possible to transfer the heat to the solid thermal storage media 3 in a desired direction by controlling the heat transfer units 50.

The magnetic refrigeration device 1 according to this embodiment uses no refrigerant, as described above. Hence, a power source such as a pump to move the refrigerant is unnecessary, and the refrigeration cycle can be speeded up. It is therefore possible to provide a magnetic refrigeration device that can be reduced in size and has high-power performance. In addition, using the magnetic refrigeration device according to this embodiment makes it possible to provide a magnetic refrigeration system capable of being reduced size and having high-power performance.

The material of the magnetic body 2 having the magneto-caloric effect according to this embodiment is not particularly limited. A magnetic body of, for example, Gd (gadolinium), a Gd compound produced by mixing various kinds of elements in Gd, an intermetallic compound containing various kinds of rare earth elements and a transition metal element, an $Ni_2MnGa$ alloy, a GdGeSi-based compound, an $LaFe_{13}$-based compound, or an $LaFe_{13}H$-based compound is usable as long as it yields the magneto-caloric effect.

The material of the solid thermal storage medium 3 according to this embodiment is selected from materials having no Curie point within the range of a temperature change of the magnetic body 2 caused by magnetic field application/removal by the magnetic field application units 6A and 6B. This is because if the temperature of the solid thermal storage medium 3 changes upon magnetic field application/removal, like the magnetic body 2, the temperature difference between the magnetic body 2 and the solid thermal storage medium 3 becomes small, and the transportable heat amount decreases. If the above-described condition is met, the solid thermal storage medium 3 can be made of a metal such as Al (aluminum), Cu (copper), Fe (iron), or stainless steel, a nonmetallic material such as silicon or carbon, a ceramic such as AlN (aluminum nitride), SiC (silicon carbide), or alumina, or a composite material thereof, although the materials are not particularly limited to those. From the viewpoint of increasing the speed of the magnetic refrigeration cycle, a material having a high thermal conductivity is preferably selected.

As for the shapes of the magnetic body 2 and the solid thermal storage medium 3, they are preferably designed to such a thickness and area that cause them to have almost the same thermal capacity.

An example of the arrangement that implements the heat transfer unit 50 capable of controlling the thermal resistance will be described next.

FIGS. 6A and 6B show the structure of the heat transfer unit 50 using electrowetting of a liquid. A dielectric film 52 is formed on the surface of an electrode 51. A droplet of a thermal conductive liquid 53 is placed on the surface of the dielectric film 52. A voltage source 13 and a switching circuit 14 are connected between the thermal conductive liquid 53 and the electrode 51. As shown in FIG. 6A, the heat transfer unit is configured to bring the thermal conductive liquid 53 into contact with a counter medium 54 such as the magnetic body 2 or the solid thermal storage medium 3 in the off state of the switching circuit 14. In this state, the thermal resistance between the electrode 51 and the counter medium 54 is low, and the heat readily passes. On the other hand, as shown in FIG. 6B, the voltage from the voltage source 13 is applied between the thermal conductive liquid 53 and the electrode 51 in the on state of the switching circuit 14. Then, the electrostatic energy of the capacitor formed by the thermal conductive liquid 53 and the electrode 51 reduces the surface energy of the thermal conductive liquid 53 and makes a contact angle θ small, and the counter medium 54 and the thermal conductive liquid 53 change to a non-contact state. In this state, the thermal resistance between the electrode 51 and the counter medium 54 is high, and the heat hardly passes. On/off-controlling the switching circuit 14 in the above-described way makes it possible to switch between the high thermal resistance state and the low thermal resistance state.

When the structure of the heat transfer unit 50 using electrowetting of a liquid shown in FIGS. 6A and 6B is incorporated in the magnetic refrigeration device shown in FIG. 1, the counter medium 54 corresponds to the magnetic body 2 or the solid thermal storage medium 3, as described above, and the electrode 51 is provided on the magnetic body 2 or the solid thermal storage medium 3 and covered with the dielectric film 52. The heat transfer control unit 10 shown in FIG. 1 includes a plurality of switches 14 corresponding to a number of heat transfer units 50 shown in FIGS. 6A and 6B, and is formed from the voltage source 13 connected to the plurality of switches 14. The switches 14 are on/off-controlled in synchronism with magnetic field application/removal to/from the magnetic bodies 2. This allows the heat transfer unit 50 to selectively set the thermal insulation state or thermal propagation state between the magnetic body 2 and the solid thermal storage medium 3.

The thermal conductive liquid 53 is not particularly limited to a specific material as long as it is a liquid having a high thermal conductivity. Water, a material obtained by dispersing thermal conductive particles in water, an ionic liquid, a liquid metal, or the like is usable.

Figure 7B:
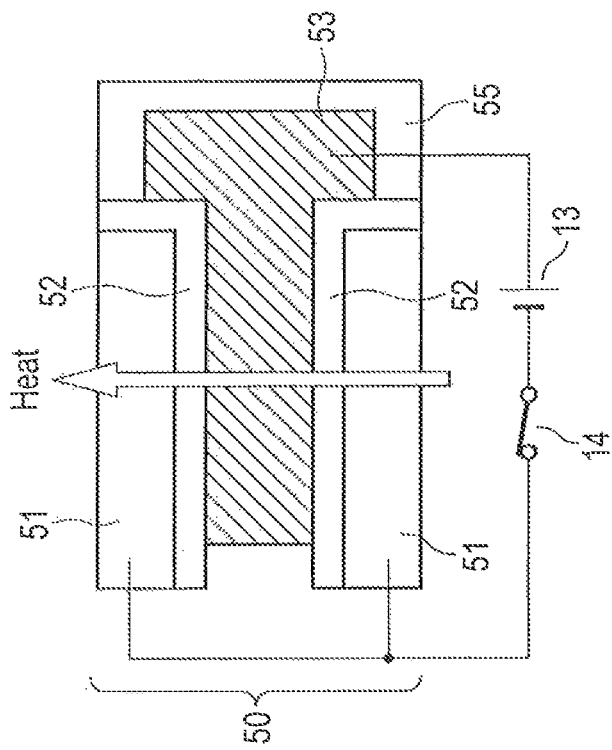
FIGS. 7A and 7B are sectional views schematically showing another unit structure of the heat transfer unit shown in FIG. 1 using a thermal conductive liquid.
Figure 7A:
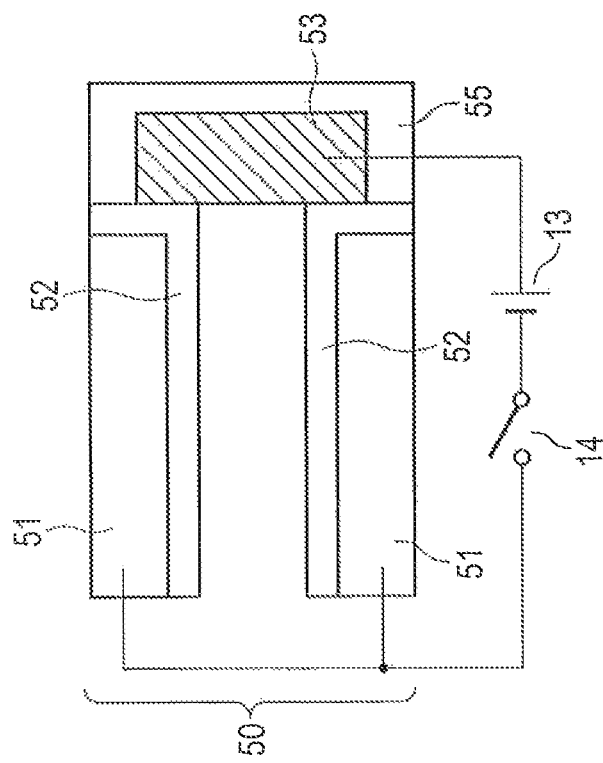

FIGS. 7A and 7B show another structural example of the heat transfer unit 50 using electrowetting of a liquid. In the structure shown in FIGS. 7A and 7B, the electrodes 51 each having the dielectric film 52 formed on their surface are arranged to face each other with a gap formed therebetween. A housing 55 having a space communicating with the gap is provided on one end side of the gap, and the thermal conductive liquid 53 is held in the space. The voltage source 13 and the switching circuit 14 are connected between the thermal conductive liquid 53 and the electrode 51.

In this structure, as shown in FIG. 7A, when the switching circuit 14 is off, the contact angle between the thermal conductive liquid 53 and the dielectric film 52 is large, and the thermal conductive liquid 53 stays in the housing 55. In this state, the gap remains between the electrodes 51, the thermal resistance between the two electrodes 51 is high, and the heat hardly passes. On the other hand, as shown in FIG. 7B, when the switching circuit 14 is on, and the voltage from the voltage source 13 is applied between the thermal conductive liquid 53 and the electrode 51, the electrostatic energy of the capacitor formed by the thermal conductive liquid 53 and the electrode 51 reduces the surface energy of the thermal conductive liquid 53 and makes the contact angle small, and the thermal conductive liquid 53 enters from the space of the housing 55 into the gap between the electrodes 51. In this state, the thermal resistance between the two electrodes 51 is low, and the heat readily passes. On/off-controlling the switching circuit 14 in the above-described way makes it possible to switch between the high thermal resistance state and the low thermal resistance state.

FIGS. 8A and 8B show a structural example that combines the heat transfer units 50 shown in FIGS. 7A and 7B. In the heat transfer unit 50 according to this structural example, the gaps between the electrodes 51 are provided on both sides of one magnetic body 2. These gaps communicate with each other via the common space formed in the housing 55. In other words, this structural example is formed such that the heat transfer units 50 as shown in FIGS. 7A and 7B are stacked while sandwiching one magnetic body 2. The single housing 55 that defines the space to communicate the gaps with each other is commonly provided for the stacked body. The thermal conductive liquid 53 can move in the gap between the two heat transfer units 50 via the space of the housing 55. In this structural example, the heat transfer units 50 are stacked on both sides of the magnetic body 2. The heat transfer units 50 may, however, be stacked on both sides of the solid thermal storage medium 3 in place of the magnetic body 2. The gaps of the two heat transfer units 50 communicate via the common space of the housing 55. However, the number of gaps is not limited to two, and gaps of three or more heat transfer units 50 may communicate via the common space of the housing 55.

In the structure shown in FIGS. 8A and 8B, the two heat transfer units 50 are connected to a first series circuit that connects a switch 14-1 and a voltage source 13-1 in series and a second series circuit that connects a switch 14-2 and a voltage source 13-2 in series, respectively. The switches 14-1 and 14-2 are alternately on/off-controlled in synchronism with magnetic field application/removal to/from the magnetic body 2. This makes it possible to move the liquid metal 53 from one heat transfer unit 50 to the other heat transfer unit 50 and selectively set the thermal insulation state or thermal propagation state between the magnetic body 2 and the solid thermal storage medium 3.

Figure 9A:
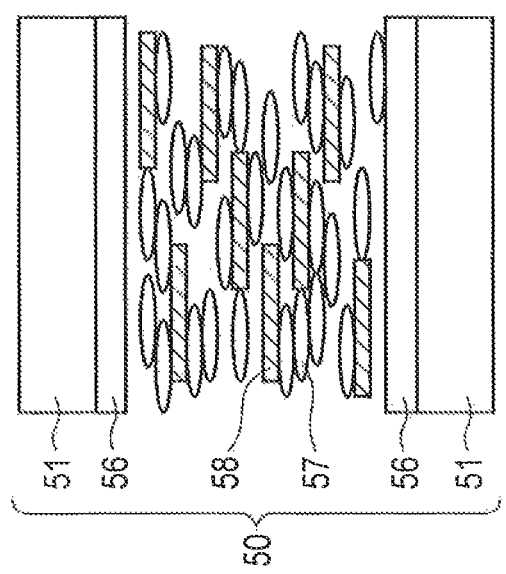
FIGS. 9A and 9B are sectional views schematically showing an arrangement of the heat transfer unit shown in FIG. 1 using a liquid crystal.
Figure 9B:
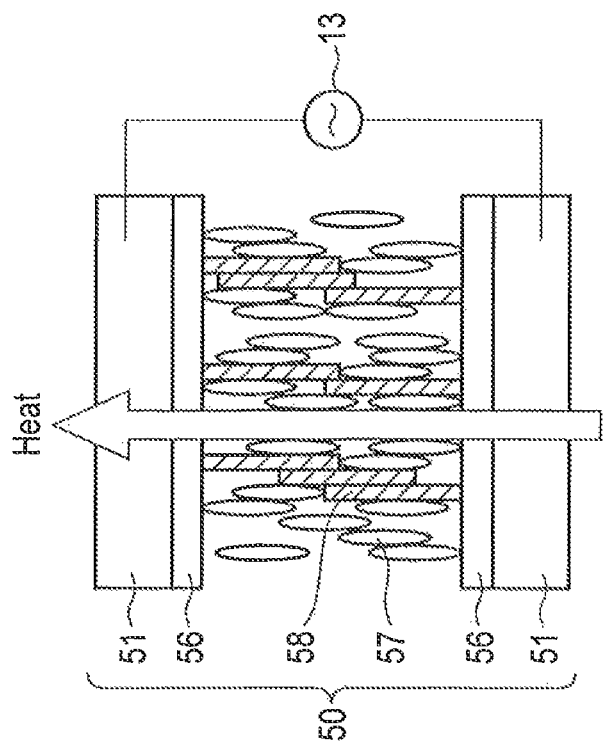

FIGS. 9A and 9B show an example of the arrangement of the heat transfer unit 50 using a liquid crystal. In the structure shown in FIGS. 9A and 9B, the electrodes 51 each having an alignment film 56 formed on their surface are arranged to face each other. A liquid crystal 57 in which a thermal conductive filler 58 is dispersed is held in the gap between the electrodes to form the heat transfer unit 50.

FIG. 9A shows a state in which no voltage is applied to the electrodes 51. The liquid crystal 57 is aligned along the alignment films 56 in the gap between the electrodes 51. Hence, in the gap between the electrodes 51, the thermal conductive filler 58 is also aligned in parallel to the electrodes 51 by the liquid crystal 57. At this time, the thermal resistance between the electrodes 51 is maintained high. On the other hand, as shown in FIG. 9B, when a voltage from the voltage source 13 is applied between the electrodes 51, the liquid crystal 57 is aligned to be perpendicular to the electrodes 51 so that its longitudinal direction is perpendicular to the electrodes 51. Along with the alignment of the liquid crystal 57, the thermal conductive filler 58 is also aligned to be perpendicular to the electrodes 51 so that its longitudinal direction is perpendicular to the electrodes 51. For this reason, the thermal conductive filler 58 forms a heat conduction path between the electrodes 51, and the thermal resistance lowers. In this structure, the direction of the thermal conductive filler 58 can be changed by voltage application/removal between the electrodes to switch the thermal resistance of the heat transfer unit 50.

As the thermal conductive filler 58, a metal, alumina, aluminum nitride, silica, silicon nitride, silicon carbide, magnesia, carbon, or the like is usable, and the material is preferably nonmagnetic. However, the materials are not particularly limited to those described above.

(Second Embodiment)

In a magnetic refrigeration system according to the second embodiment, the internal space of a magnetic refrigeration device 1 shown in FIG. 1 is decompressed and maintained in a low pressure state. When the space in the magnetic refrigeration device 1 is decompressed, the thermal resistance of a heat transfer unit 50 in a high thermal resistance state is further raised, the heat backflow from the high temperature side to the low temperature side is suppressed, and the heat transport efficiency is improved.

Figure 10:
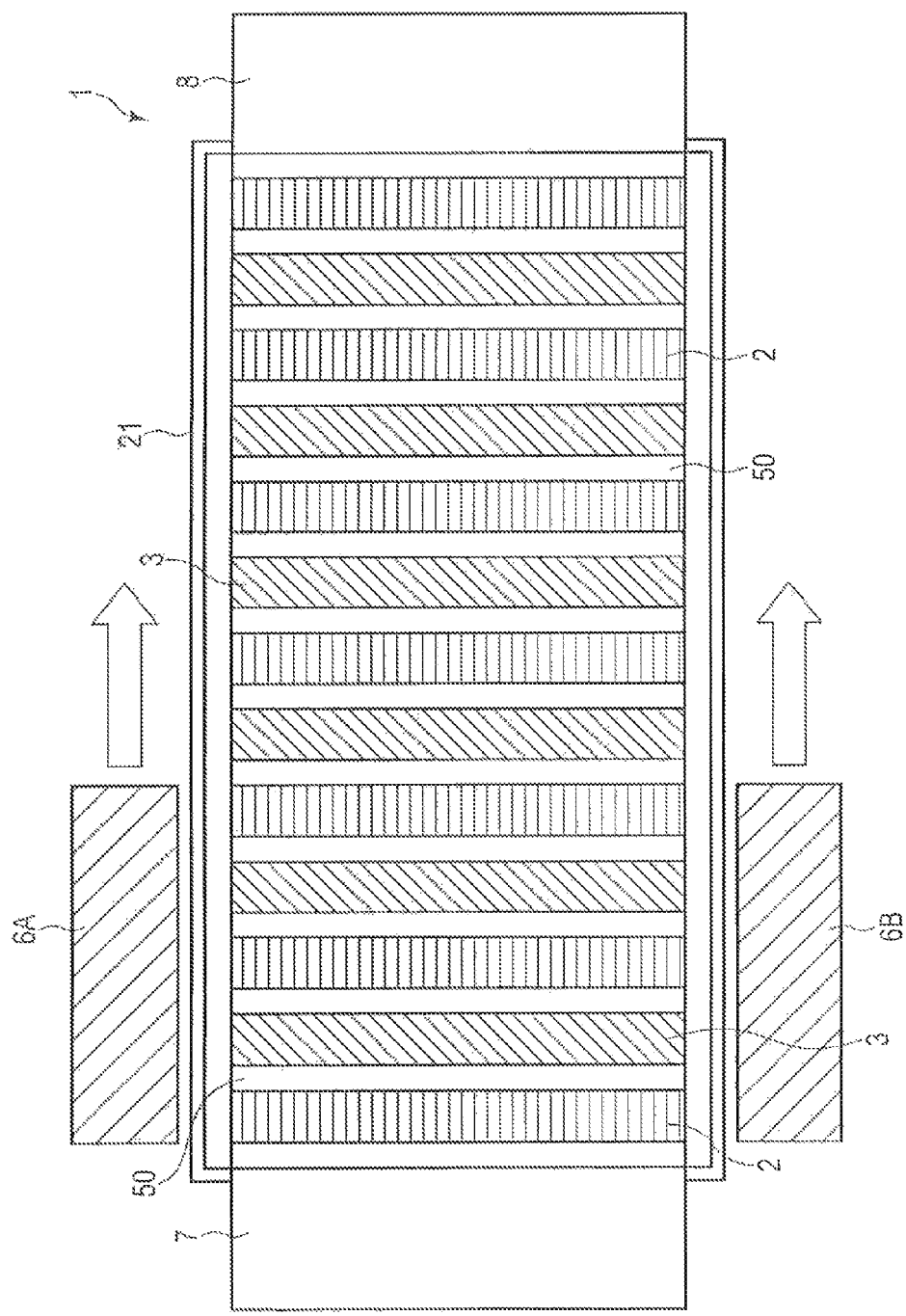
FIG. 10 is a sectional view schematically showing the structure of the main parts of a magnetic refrigeration device according to the second embodiment.

The magnetic refrigeration system according to the second embodiment is implemented by, for example, storing the magnetic refrigeration device 1 in a decompression container 21 that encloses the magnetic refrigeration device 1, as shown in FIG. 10.

The decompression container 21 is nonmagnetic and is made of a resin such as a plastic. A metal such as aluminum may be used to increase the strength of the decompression container 21. However, a resin or the like having a high electrical resistance is preferably applied as the material of the decompression container 21 from the viewpoints of suppressing an eddy current generated upon magnetic field application/removal and heat insulation performance.

Figure 11:
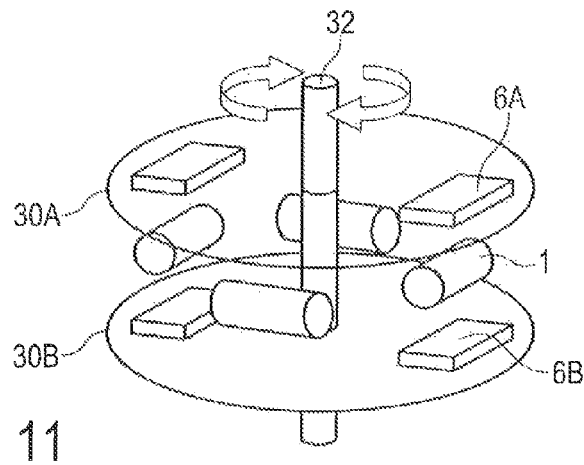
FIG. 11 is a perspective view schematically showing a magnetic refrigeration system according to an embodiment.

The magnetic refrigeration device shown in FIGS. 1, 2A, 2B, 3, 4, 5, 6A, 6B, 7A, 7B, 8A, 8B, 9A, 9B, and 10 can be implemented as the magnetic refrigeration system shown in FIG. 11.

FIG. 11 is a schematic perspective view of the magnetic refrigeration system according to this embodiment. Four magnetic refrigeration devices 1 having the structure shown in FIG. 1 are arranged on a first circumference. Two pairs of magnetic field application units 6A and 6B are similarly arranged on second and third circumferences defined on the upper and lower sides of the first circumference so as to have the same central axis. For example, the two magnetic field application units 6A are fixed on an upper rotating plate 30A defining the second circumference, and the two magnetic field application units 6B are fixed on a lower rotating plate 30B defining the third circumference. The four magnetic refrigeration devices 1 are formed as magnetic refrigeration device units including solid thermal storage media 3 and magnetic bodies 2 except for a heat transfer control unit 10 and the magnetic field application units 6A and 6B.

The upper rotating plate 30A and the lower rotating plate 30B are fixed to a rotating shaft 32 provided at the center of the first circumference on which the magnetic refrigeration devices 1 are provided. The upper rotating plate 30A and the lower rotating plate 30B synchronously rotate about the rotating shaft 32. The rotating shaft 32 is rotated by, for example, a motor (not shown). In accordance with this rotation, the magnetic field application units 6A and 6B repetitively simultaneously move close to the magnetic refrigeration devices 1 and move away from them. As the magnetic field application units 6A and 6B move close to and away from the magnetic refrigeration devices 1, heat propagation occurs in the magnetic refrigeration devices 1, as already described.

In the system of this embodiment, two pairs of magnetic field application units 6A and 6B are attached to the rotating plates 30A and 30B. However, not two pairs but one pair or three pairs or more may be usable. From the viewpoint of stabilizing the rotation of the rotating plates 30A and 30B, a plurality of pairs of magnetic field application units 6A and 6B are preferably arranged to be symmetric with respect to the point of the rotating shaft 32.

In this embodiment, four magnetic refrigeration devices 1 are arranged on the same circumference. However, instead of four magnetic refrigeration devices 1, one to three magnetic refrigeration devices 1 or five or more magnetic refrigeration devices 1 may be arranged.

Figure 12:
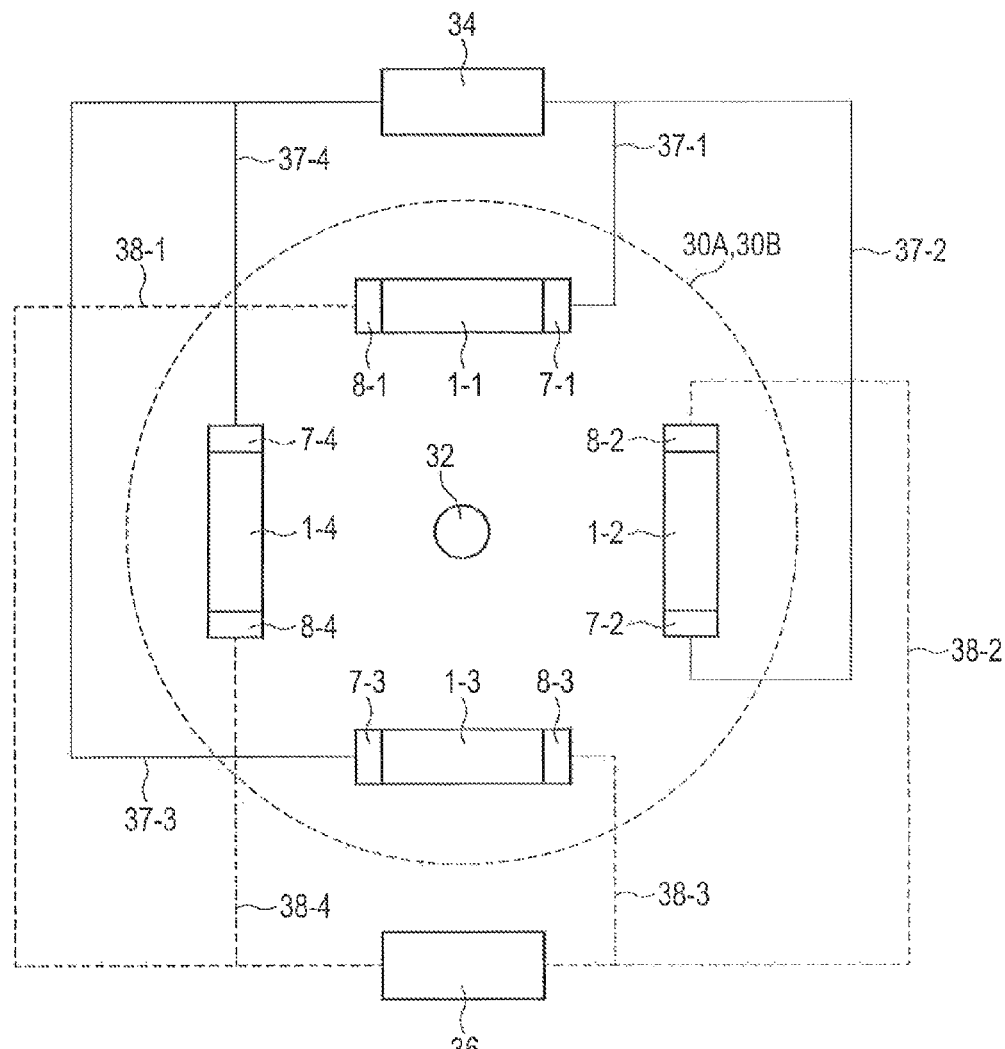
FIG. 12 is a plan view schematically showing the arrangement and structure of a magnetic refrigeration system according to another embodiment.

FIG. 12 is a plan view schematically showing the arrangement and structure of a magnetic refrigeration system according to another embodiment. As shown in FIG. 12, four magnetic refrigeration devices 1-1, 1-2, 1-3, and 1-4 are arranged on an upper rotating plate 30A and a lower rotating plate 30B to be located on the same circumference about a rotating shaft 32 of the rotating plates 30A and 30B.

High-temperature-side heat exchange units 7-1, 7-2, 7-3, and 7-4 of the magnetic refrigeration devices 1-1, 1-2, 1-3, and 1-4 are thermally connected in parallel to a heat dissipation unit 34. Low-temperature-side heat exchange units 8-1, 8-2, 8-3, and 8-4 of the magnetic refrigeration devices 1-1, 1-2, 1-3, and 1-4 are thermally connected in parallel to a heat absorption unit 36.

Thermal energy generated in the high-temperature-side heat exchange units 7-1, 7-2, 7-3, and 7-4 by the magnetic refrigeration cycle is transported to the heat dissipation unit 34 via, for example, heat exchangers 37-1, 37-2, 37-3, and 37-4, respectively. On the other hand, cryogenic energy generated in the low-temperature-side heat exchange units 8-1, 8-2, 8-3, and 8-4 by the magnetic refrigeration cycle is transported to the heat absorption unit 36 via, for example, heat exchangers 38-1, 38-2, 38-3, and 38-4, respectively.

Transports of the thermal energy and cryogenic energy to the heat dissipation unit 34 and the heat absorption unit 36, which are indicated by the solid lines and the dotted lines in FIG. 12, can be implemented using a known heat exchange gas or liquid, solid heat conduction, or the like.

Figure 13:
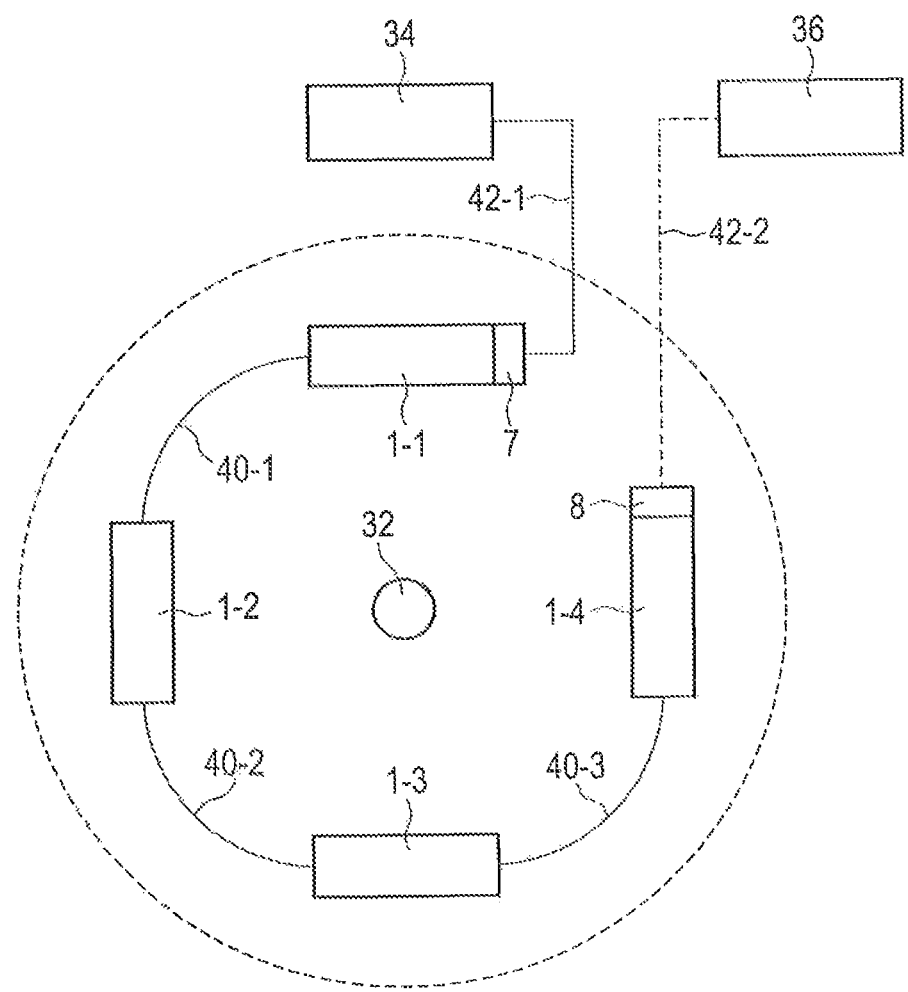
FIG. 13 is a plan view schematically showing the arrangement and structure of a magnetic refrigeration system according to still another embodiment.

FIG. 13 is a plan view schematically showing the structure of a magnetic refrigeration system according to still another embodiment. In the embodiment shown in FIG. 13, four magnetic refrigeration devices 1-1, 1-2, 1-3, and 1-4 are thermally connected in series with each other, unlike the embodiment shown in FIG. 12.

The ends of the adjacent magnetic refrigeration devices 1-1, 1-2, 1-3, and 1-4 are connected via heat conductors 40-1, 40-2, and 40-3. A high-temperature-side heat exchange unit 7 is provided on one end side of the magnetic refrigeration device 1-1 at one end out of the four magnetic refrigeration devices 1-1, 1-2, 1-3, and 1-4. The high-temperature-side heat exchange unit 7 is connected to a heat dissipation unit 34 via a heat conductor 42-1. A low-temperature-side heat exchange unit 8 is provided on the other end side of the magnetic refrigeration device 1-4 at the other end. The low-temperature-side heat exchange unit 8 is connected to a heat absorption unit 36 via a heat conductor 42-2.

The magnetic transition temperature of the magnetic bodies of the magnetic refrigeration device 1-1 at one end including the high-temperature-side heat exchange unit 7 is higher than the magnetic transition temperature of the magnetic bodies of the magnetic refrigeration device 1-4 at the other end including the low-temperature-side heat exchange unit 8. For example, the magnetic transition temperature sequentially lowers from the magnetic bodies of the magnetic refrigeration device 1-1 at one end including the high-temperature-side heat exchange unit 7 to the magnetic bodies of the adjacent the magnetic refrigeration device 1-2, and the magnetic bodies of the magnetic refrigeration device 1-4 at the other end including the low-temperature-side heat exchange unit 8 have the lowest magnetic transition temperature.

In the magnetic refrigeration system according to the embodiment shown in FIG. 13, the high-temperature-side heat exchange unit 7 of the magnetic refrigeration device having the above-described arrangement is thermally connected to the heat dissipation unit 34. In addition, the low-temperature-side heat exchange unit 8 is thermally connected to the heat absorption unit 36.

According to the embodiment shown in FIG. 13, the magnetic refrigeration devices using magnetic bodies having different magnetic transition temperatures are connected in series, thereby implementing a large magnetic refrigeration temperature difference.

The embodiments have been described above with reference to detailed examples. However, these embodiments have been presented by way of example only, and are not intended to limit the scope of the embodiments. In addition, the constituent elements of the embodiments may appropriately be combined.

The magnetic field application/removal mechanism has been described using, as an example, a case in which the magnetic field application units make a rotary motion. However, the magnetic field application units may reciprocally move with respect to the magnetic refrigeration device. In this case, a linear driving actuator or cam mechanism that converts the rotary motion into a linear motion is preferably used. In addition, the magnetic field application units and the magnetic refrigeration device can be moved relatively easily by hand, using a branched driving force of an automobile, or directly using natural energy such as wind power, wave power, or water power.

In the explanation of the embodiments, descriptions of units of the magnetic refrigeration device or magnetic refrigeration system which are not directly needed for an understanding of the embodiments have been omitted. However, necessary elements associated with the magnetic refrigeration device or magnetic refrigeration system can appropriately be selected and used.

All magnetic refrigeration devices and magnetic refrigeration systems which include the elements of the embodiments and whose designs can appropriately be modified by those skilled in the art are incorporated in the scope of the embodiments. The scope of the embodiments is defined by the appended claims and their equivalents.

As described above, the magnetic refrigeration device according to the embodiment has the above-described arrangement. This obviates the necessity of moving a refrigerant and enables speedup of the refrigeration cycle. It is therefore possible to provide a magnetic refrigeration device capable of being reduced in size and having high-power performance. In addition, using the magnetic refrigeration device according to the embodiment makes it possible to provide a magnetic refrigeration system capable of being reduced in size and having high-power performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A magnetic refrigeration device comprising:
   magnetic bodies arrayed at an interval, each of the magnetic bodies having a magneto-caloric effect;
   a magnetic field application unit configured to apply and remove a magnetic field to and from the magnetic bodies, respectively;
   a thermal storage medium arranged to face at least one of the magnetic bodies, the thermal storage medium having no Curie point within a range of a temperature change of the magnetic bodies caused by magnetic field application and removal by the magnetic field application unit, and the thermal storage medium having a heat storage effect; and
   a heat transfer unit configured to selectively bring the thermal storage medium into thermal contact with the magnetic bodies or thermally isolate the thermal storage medium from the magnetic bodies, and transfer heat from the magnetic bodies to the thermal storage medium or from the thermal storage medium to the magnetic bodies in synchronism with magnetic field application and removal by the magnetic field application unit.

2. The device according to claim 1, further comprising an enclosing unit configured to maintain the magnetic refrigeration device in a decompressed space.

3. A magnetic refrigeration system comprising a magnetic refrigeration device of claim 1.

4. A magnetic refrigeration system comprising a magnetic refrigeration device of claim 2.

5. A magnetic refrigeration system comprising:
   a plurality of magnetic refrigeration device units arrayed substantially along a circumference, each magnetic refrigeration device unit comprising:
      magnetic bodies arrayed at an interval, each of the magnetic bodies having a magneto-caloric effect;

a thermal storage medium arranged to face at least one of the magnetic bodies and having a heat storage effect; and a heat transfer unit configured to selectively bring the thermal storage medium into thermal contact with the magnetic bodies or thermally isolate the thermal storage medium from the magnetic bodies, and transfer heat from the magnetic bodies to the thermal storage medium or from the thermal storage medium to the magnetic bodies in synchronism with magnetic field application and removal; and one or more magnetic field application units arranged along the circumference above or below the circumference of the magnetic refrigeration device units and configured to rotate, the magnetic field application unit applying a magnetic field to the magnetic body or removing the applied magnetic field in accordance with rotation of the magnetic field application unit.

6. The system according to claim 5, wherein the magnetic refrigeration device units are thermally connected in series or in parallel.

* * * * *